United States Patent [19]
Raes

[11] 3,970,208
[45] July 20, 1976

[54] PROTECTIVE SHIELD FOR PRESSURE VESSELS

[75] Inventor: Herman Raes, Waasmunster, Belgium

[73] Assignee: National Forge Company, Irvine, Pa.

[22] Filed: Nov. 26, 1974

[21] Appl. No.: 527,195

[30] Foreign Application Priority Data
Dec. 28, 1973  United Kingdom............... 59985/73

[52] U.S. Cl..................................... 220/3; 220/10; 220/71; 220/327
[51] Int. Cl.². ......................................... B65D 7/44
[58] Field of Search ................... 220/3, 71, 10, 327; 215/12 R; 217/66–68

[56] References Cited
UNITED STATES PATENTS

| | | | |
|---|---|---|---|
| 512,812 | 1/1894 | Davison | 215/12 R |
| 530,207 | 12/1894 | Smith | 215/12 R |
| 799,069 | 9/1905 | Meyer | 215/12 R |
| 1,013,693 | 1/1912 | Steel | 215/12 R |
| 1,188,904 | 6/1916 | Cosgriff | 215/12 R |
| 1,280,440 | 10/1918 | Goldowitz | 220/71 |
| 1,359,057 | 11/1920 | Galdaman | 220/71 |
| 2,339,554 | 1/1944 | Kuhn | 220/3 |
| 2,344,856 | 3/1944 | Earle | 220/3 |
| 2,360,391 | 10/1944 | Birchall | 220/3 |
| 2,685,979 | 8/1954 | Zeek et al. | 220/71 |
| 3,256,069 | 6/1966 | Peterson | 220/3 |
| 3,282,459 | 11/1966 | Wilson | 220/3 |
| 3,319,292 | 5/1967 | Witkin | 425/405 |
| 3,357,588 | 12/1967 | Graham | 220/10 |
| 3,476,281 | 11/1969 | Cornish et al. | 220/3 |
| 3,477,605 | 11/1969 | Garland | 220/3 |
| 3,487,442 | 12/1969 | Rossmann | 220/288 |
| 3,570,700 | 3/1971 | Yamamoto | 220/10 |
| 3,570,701 | 3/1971 | Yamamoto | 220/10 |
| 3,578,564 | 5/1971 | Fletcher | 176/87 |
| 3,587,905 | 6/1971 | McFarland | 220/3 |
| 3,595,423 | 7/1971 | Yamamoto | 220/10 |
| 3,606,067 | 9/1971 | Jones | 220/10 |
| 3,612,331 | 10/1971 | Jorgensen | 220/3 |
| 3,618,818 | 11/1971 | Puyo | 220/3 |
| 3,719,302 | 3/1973 | Hamilton | 220/9 LG |
| 3,744,660 | 7/1973 | Gaines et al. | 220/10 |

*Primary Examiner*—George E. Lowrance
*Assistant Examiner*—Allan N. Shoap
*Attorney, Agent, or Firm*—Ronald A. Schapira

[57] ABSTRACT

A protective shield for a pressure vessel which includes a ductile member for absorbing kinetic energy released if the pressure vessel fails by a portion of the pressure vessel breaking-off and tending to fly away from the remainder of the pressure vessel; the ductile member or a portion thereof undergoing substantial deformation, but not breaking, when loaded by the portion of the pressure vessel which tends to fly-away when the pressure vessel fails.

15 Claims, 6 Drawing Figures

FIG.I.

PROTECTIVE SHIELD FOR PRESSURE VESSELS

BACKGROUND OF THE INVENTION

This invention relates to a light weight, relatively low cost and simple, protective, energy absorbing shield for pressure vessels and the like. This invention is particularly concerned with a protective shield which, in the event of a failure of the pressure vessel, prevents the portion of the pressure vessel, that has broken-off, from flying-away from the remainder of the pressure vessel.

Protective shields for pressure vessels are well known in the art. See, for example, U.S. Pat. Nos. 2,360,391, 3,256,069, 3,282,459, 3,357,588, 3,476,281, 3,477,605, 3,570,700, 3,570,701, 3,578,564, 3,587,905, 3,595,423, 3,606,067, 3,612,331, 3,719,302 and 3,744,660. Generally, such protective shields have been relatively massive structures. In fact, they have often been constructed of a size, weight, and cost comparable to the pressure vessels which they are shielding.

The use of these relatively massive protective shields for high pressure vessels has been considered necessary. One reason for this has been the great danger inherent in high pressure vessels. The use of high pressures as, for example, in the chemical reaction vessel of U.S. Pat. No. 3,256,069 and the isostatic molding vessel of U.S. Pat. No. 3,319,292, has posed serious hazards associated with the possible, catastrophic failure of the high pressure vessels. Although failures of pressure vessels have been rare, the high, internal pressures currently utilized in such vessels have increased greatly both the probability of failure of such vessels and the chances of serious damage to life and property in the event of the vessels' failure.

When high pressure vessels have failed, broken parts of the vessels or of the devices used in conjunction with such vessels have tended to fly-away at high velocities and with tremendous kinetic energy from the remainder of the pressure vessels. Because of their velocity and energy, such broken parts have had the obvious potential for causing serious injuries to persons and property in the vicinity of the pressure vessels.

However, means have been sought for providing relatively smaller, lighter and less costly protection against injury to persons and property in the event of a possible failure of a pressure vessel. Protective means have been especially sought which do not interfere excessively with the use and operation of the pressure vessel and do not add excessively to the cost of the pressure vessel and its operation.

SUMMARY OF THE INVENTION

In accordance with this invention, a protective shield for a pressure vessel is provided, comprising a ductile means for absorbing kinetic energy released if the pressure vessel fails by a portion of the pressure vessel breaking-off and tending to fly-away from the pressure vessel; said ductile means undergoing substantial deformation when loaded by the portion of the presssure vessel tending to fly-away when the pressure vessel fails; and means for attaching said ductile means to said pressure vessel so that if said pressure vessel fails, said ductile means will be loaded by said portion of the pressure vessel breaking-off and tending to fly-away.

By this invention, a relatively simple, inexpensive, and light weight shield is provided for a pressure vessel. The shield is adapted not to interfere substantially with the normal use or operation of the pressure vessel, but is well suited for preventing broken-off portions of the pressure vessel, should it fail, from flying-away and injuring persons or property.

DETAILED DESCRIPTION OF THE INVENTION

Figure 1:
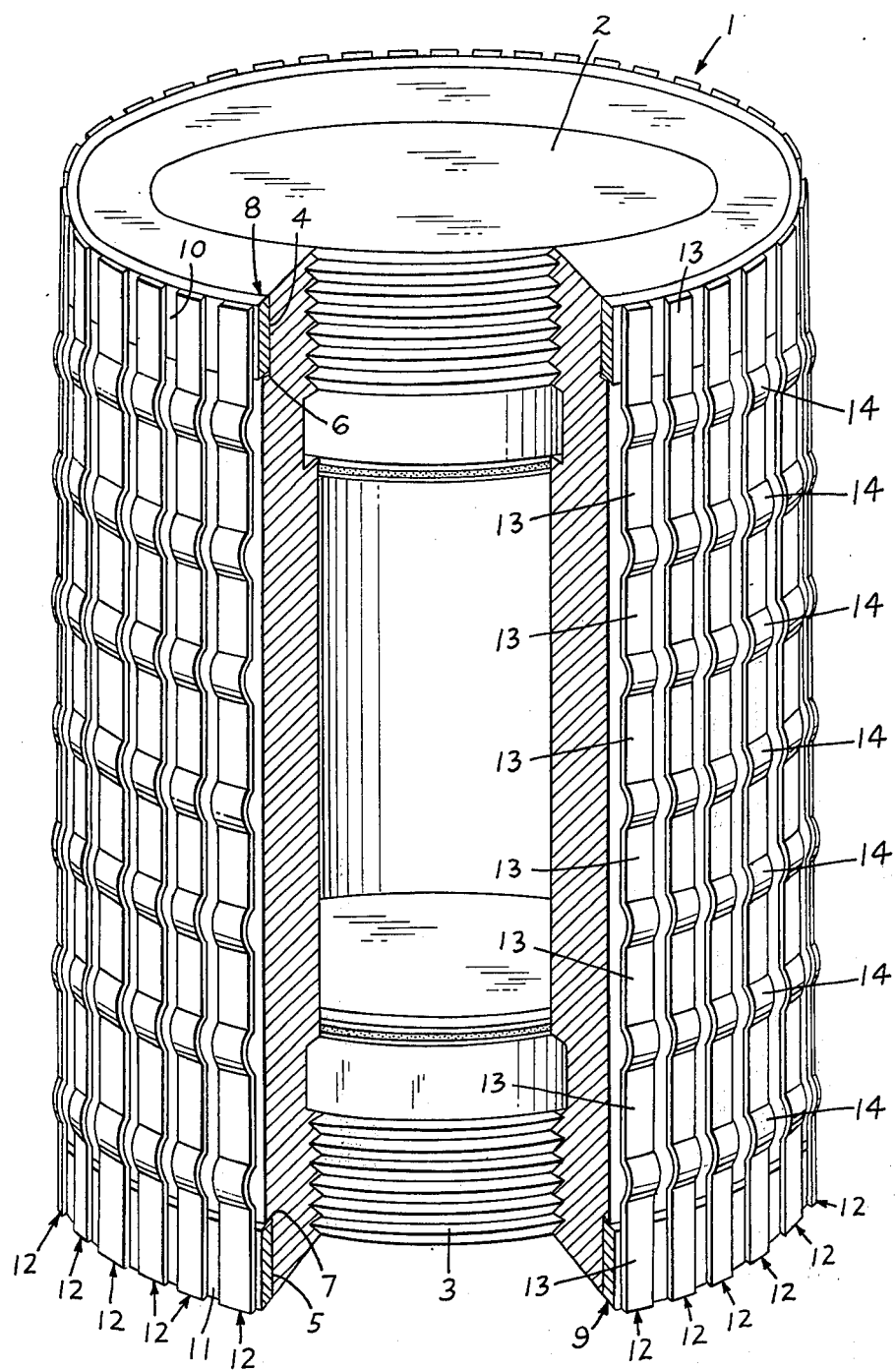
FIG. 1 is a schematic perspective view of a pressure vessel on which is mounted one form of the protective shield of this invention; a segment of the pressure vessel and of the protective shield is broken away to illustrate more clearly the construction.
Figure 2:
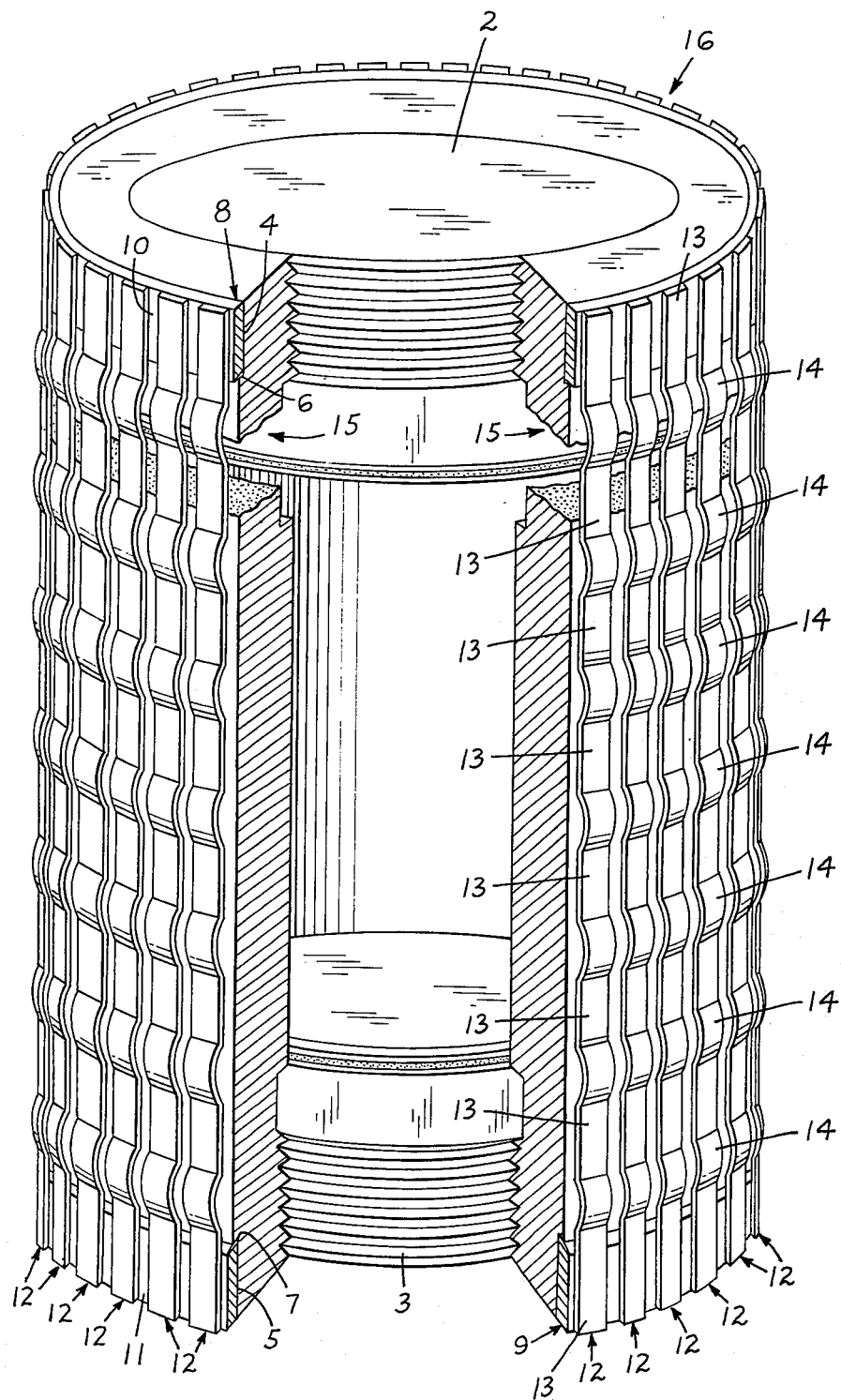
FIG. 2 is a schematic, perspective view, similar to FIG. 1, showing the pressure vessel and shield of FIG. 1 after a failure of the pressure vessel.

Shown in FIGS. 1 and 2 is a hollow, cylindrical, pressure vessel 1 having threaded end closures 2 and 3 at opposite ends thereof. In accordance with this invention, the pressure vessel 1 and its end closures 2 and 3 are conventional and may be of any desired design. Numerous forms of such pressure vessels and closures are widely known and used in the isostatic pressing field as shown, for example, in U.S. Pat. Nos. 3,319,292 and 3,487,442. However, this invention is not limited to pressure vessels and closures suitable for isostatic pressing. Rather, this invention is broadly applicable to any pressure vessel which is subject to sudden structural failures and consequent throwing-off of broken parts at high velocities. Nevertheless, for purpose of this description, the invention will be described primarily in connection with pressure vessels used for isostatic pressing. This is because the invention is particularly well suited for protecting against catastrophic failure of such vessels, which are subjected to periodic, rapid applications of high internal pressures.

As seen in FIGS. 1 and 2, the upper and lower ends of the outer wall of the pressure vessel 1 are provided with annular recesses affording vertical shoulders 4 and 5 and horizontal shoulders 6 and 7.

Also shown in FIGS. 1 and 2 are annular metal rings 8 and 9 mounted in the upper and lower annular recesses, respectively, defined by the shoulders 4, 5, 6 and 7. The heights of the rings 8 and 9 are preferably equal to the heights of the vertical shoulders 4 and 5, respectively, so that the upper end of the ring 8 is flush with the top surface of the pressure vessel and the lower end of the ring 9 is flush with the bottom surface of the pressure vessel.

Figure 5:
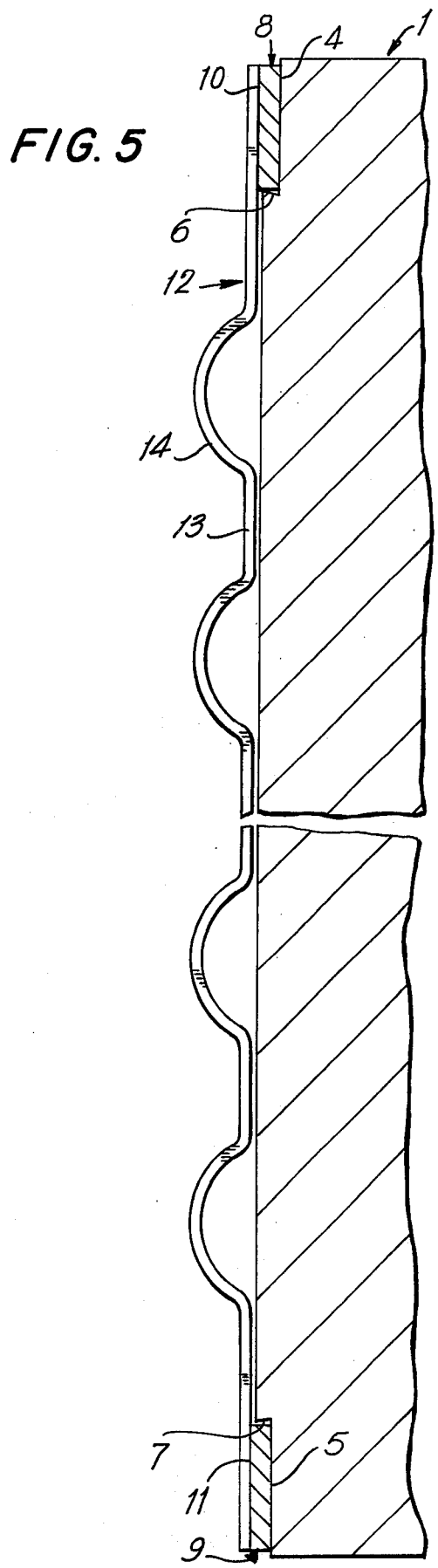
FIG. 5 is a fragmentary, sectional view of a portion of the pressure vessel and shield of FIG. 1, taken along line 5—5 in FIG. 1.

The thickness of the rings 8 and 9 is preferably slightly greater than the length of the horizontal shoulders 6 and 7 so that the outer, vertical surfaces 10 of the ring 8 and the outer, vertical surface 11 of the ring 9 are located radially outwardly of the outer cylindrical surface of the vessel 1. As seen in FIG. 5, the horizontal shoulders 6 and 7 of the pressure vessel 1 are preferably inclined somewhat inwardly, towards the center of the vessel, so that the retaining rings 8 and 9 will be less prone to slip off of the horizontal shoulders 6 and 7 in the event of the failure of the pressure vessel 1. Preferably, the horizontal shoulders 6 and 7 are inclined by about 5° to 15°, especially about 10°.

Further shown in FIGS. 1, 2, 5 and 6 are a series of vertical, spaced metal straps 12 provided around the periphery of the vessel 1. Each of the metal straps 12 includes a series of straight segments 13 separated by arcuate segments 14. The uppermost straight segment 13 of each strap 12 is rigidly affixed to the outer surface of ring 8, preferably by welding. Similarly, the lowermost, straight segment 13 of each strap 12 is rigidly affixed to the outer surface of ring 9, preferably by welding. The strength of each weld which joins each strap 12 to the rings 8 and 9 should be greater than the tensile strength of the strap.

The plurality of vertical, spaced metal straps 12 in combination with the annular metal rings 8 and 9 comprise the protective shield of this invention for the pressure vessel 1. This protective shield is basically a cage structure mounted around the pressure vessel in such a way that in the normal operation of the pressure vessel, the shield bears no load and does not become stressed. Upon a fracture of the pressure vessel, the shield resists the outward thrust (usually axially oriented) of broken parts under pressure. The shield gradually deforms to absorb the energy of the moving parts until finally the ultimate tensile strength of the shield resists further deformation.

Each vertical, spaced metal strap in the shield is preferably made of a ductile material, such as mild steel, copper, or aluminum. In the metal straps 12, any conventional ductile material can be utilized. The especially preferred materials for the ductile straps have an ultimate tensile strength of between about 37 and 45 kg/mm², a yield strength of about 20 to about 24 kg/mm² and an elongation of about 20% to about 27%. For these ductile metal straps, the particularly preferred materials are the low carbon, relatively soft or mild steels, which can be easily worked to form the metal straps 12 having the arcuate segments 14. However, if desired, the arcuate segments 14 can be made of one of the aforementioned ductile materials, and the straight segments 13 can be made of a different, less ductile material.

The curved or arcuate segments 14 of the ductile metal straps 12 comprise a preferred ductile means, in accordance with this invention, for absorbing the kinetic energy released if the pressure vessel 12 fails by a portion of the pressure vessel breaking-off and tending to fly away from the remainder of the pressure vessel 1. The ductile means is designed to undergo substantial deformation but not to break when loaded by the broken-off portion of the pressure vessel tending to fly-away from the remainder of the pressure vessel in the event of the vessel's failure. By substantial deformation is meant that the ductile means is permanently stretched (or compressed) by at least about 10% of its length after being loaded by the broken-off part of the vessel 1. Preferably, the substantial deformation involves a change in the length of about 20 to 80%, especially about 30 to 50%. In deforming, when loaded by the force of the broken-off part of the pressure vessel, the arcuate segments 14 of the ductile metal straps 12 initially undergo elastic deformation and then undergo plastic deformation. The straps 12 are preferably adapted so that all or most of the kinetic energy of the broken-off portion of the pressure vessel is expended in substantially deforming the arcuate segments 14 to a substantially straight condition. Then, if necessary, the straps 12, as a whole, are deformed to absorb the rest of the energy of the broken part of vessel 1. In this way, the straps undergo a controlled stretch over a limited distance but do not break, and the broken-off portion of the pressure vessel cannot fly away to injure persons or property.

The annular metal rings 8 and 9, in combination with the horizontal shoulders 6 and 7 of the pressure vessel 1 and the straight segments 13 of the straps 12, comprise a means for attaching the ductile means to the pressure vessel so that if the pressure vessel fails, the ductile means will be loaded by the portion of the pressure vessel breaking-off and tending to fly away. The rings 8 and 9 in the attaching means can be made from any relatively strong, non-brittle material, such as the ductile materials used in the metal straps 12. The annular rings 8 and 9 must be so adapted that the ultimate tensile strength thereof is greater than that of the individual metal straps 12. Preferably, the annular rings 8 and 9 are made of the same material as the metal straps 12 so that the straps can be welded to the metal rings.

There should be sufficient clearance between the rings 8 and 9 and the pressure vessel vertical shoulders 4 and 5 so that the rings, and more importantly the straps 12, are not stressed during normal working cycles of the pressure vessel. In this way, fatigue stress of the straps is avoided.

During the normal operation of the pressure vessel 1, the shield of this application, formed by rings 8 and 9 and straps 12, is not under any load nor is it subject to any stress. Hence, the shield is not prone to fatigue failure in the event of the failure of the pressure vessel.

In a pressure vessel used for isostatic pressing, a failure of the vessel is a most unusual occurrence. However, where such a failure does occur, it is most likely to occur in a plane perpendicular to the axis of the vessel. In FIGS. 1 and 2, this would be the horizontal plane. Such a failure is shown in FIG. 2 as a crack 15, in the pressure vessel wall, which goes completely around the pressure vessel. If such a failure were to occur without restraint, the broken head (upper) portion 16 of the pressure vessel, including the end closure 2, would be thrown-out at a high velocity in an axial direction, almost in the manner of an artillery shell. Due to its high velocity, the broken head portion 16 would possess enormous energy and would be readily capable, therefore, of causing injury to persons and damage to property.

With the shield of this application, this enormous kinetic energy of the broken head portion 16 of the pressure vessel 1 is absorbed before the head portion has had a chance to travel far or cause any damage. The absorption of energy from the separated head portion 16 commences slowly as soon as a fracture 15 occurs. Such absorption of energy starts slowly by elastic deformation of the arcuate portions 14 of the straps 12. The elastic deformation of the arcuate portions 14 is followed by plastic deformation of the arcuate portions 14. Eventually, elastic and plastic deformation of the entire straps 12, including both their arcuate 14 and straight 13 portions, occurs until all the energy of the broken head portion 16 has been absorbed. FIG. 2 illustrates the condition of the pressure vessel and shield with the arcuate portions 14 substantially, but not fully, deformed.

The shield in accordance with this invention is constructed so that it will not rupture in the course of absorbing the maximum possible energy from a fracture of the pressure vessel. The design strength which is required for the shield can be calculated from a knowledge of the maximum internal pressure, generally about 1,000 to 6,000 kg/cm², which is to be internally applied to the pressure vessel 1. The thickness and width of the straps 12, the number of the straps 12, the radius of the arcuate portions 14, the number of arcuate portions 14 in each strap, and the tensile strength of the metal used for the straps are the major parameters which determine the strength of the shield structure. These parameters are varied in accordance with this invention so that the shield will deform but not break in the event of the failure of the pressure vessel.

Figure 3:
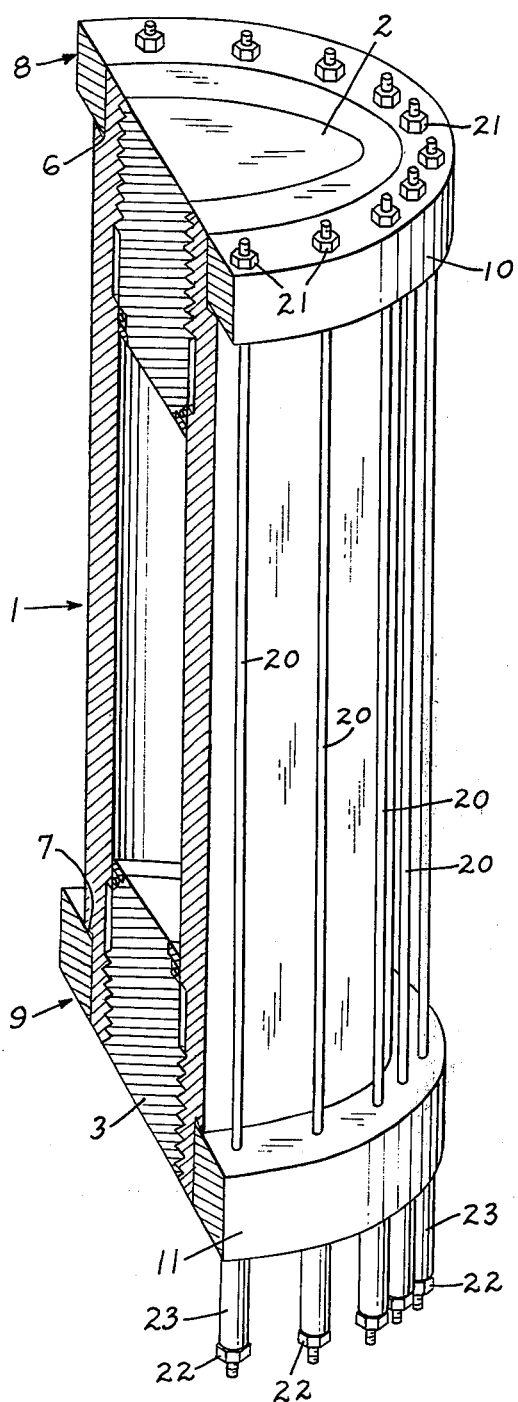
FIG. 3 is a schematic, partial, perspective view, partially broken away, illustrating a pressure vessel on which is mounted another form of protective shield embodying this invention.

By way of example, in a pressure vessel, such as the vessel 1 of FIGS. 1 and 3, suitable for isostatic pressing, having a 90 cm inside diameter (90.17 cm inside diameter at the seal) and a 250 cm inside length and operating at an internal pressure of 2000 kg/cm², the total axial force on the ends 2 and 3 of the pressure vessel is about $(\pi/4) \times 90.17^2 \text{ cm}^2 \times 2000 \text{ kg/cm}^2 = 12.77 \times 10^6$ kg. Assuming that the fluid in the pressure vessel, through which the 2000 kg/cm² force is applied, is 7% compacted (i.e. compacted 17.5 cm lengthwise) when under 2000 kg/cm² pressure, then the total energy contained in the compacted fluid is ½ (12.77 × 10⁶kg × 17.5 cm) = 111.73 × 10⁶ kg cm.

Figure 4:
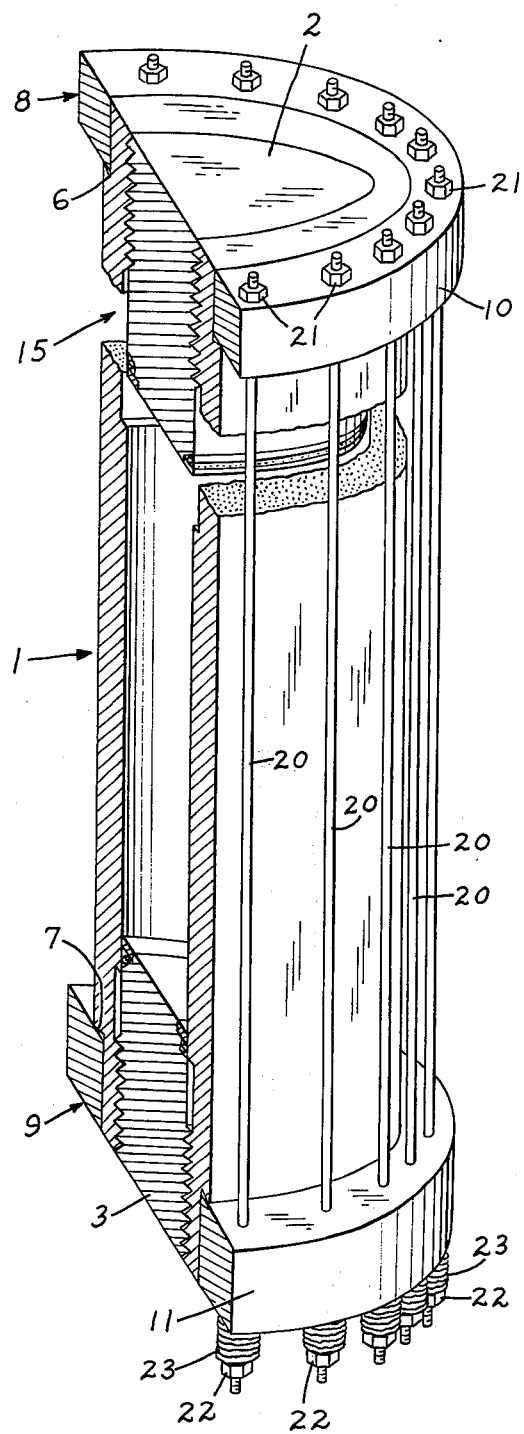
FIG. 4 is a schematic, perspective view, similar to FIG. 3, showing the pressure vessel and shield of FIG. 3 after a failure of the pressure vessel.

In this example, if the pressure vessel 1 fails in an axial direction by a fracture 15 occurring above the seal inside the vessel, as shown in FIGS. 2 and 4, a portion of the energy in the compacted fluid is converted to kinetic energy of the broken part 16 of the pressure vessel. The kinetic energy imparted to the broken part depends on the pressure relief system of the particular pressure vessel. Assuming a 1.6 cm axial movement of the broken-off end 16 of the pressure vessel 1 is sufficient to cause the seal in the vessel to break, thereby releasing the remaining energy of the fluid as free expansion of the fluid, the axial pressure in this example on the end at the occurence of the break is $$2000 \text{ kg/cm}^2 \times \frac{17.5 \text{ cm} - 1.6 \text{ cm}}{17.5 \text{ cm}} = 1,817 \text{ kg/cm}^2.$$

and the energy of the broken-off part is $$\frac{(2,000 \text{ kg/cm}^2 + 1,817 \text{ kg/cm}^2)}{2} \times \frac{\pi}{4} \times 90.17^2 \text{ cm}^2 \times 1.6 \text{ cm} = 19.50 \times 10^6 \text{ kg/cm}.$$

Of course, greater or lesser amounts of kinetic energy may be imparted to the broken part of the vessel by the internal fluid, dependng upon the design of the pressure vessel in regard to relief of the internal seal in response to movement of the broken-off end of the vessel.

In the example, without a protective shield of this invention, assuming that the weight of the broken-off part 16 is about 2,000 kg, the maximum height of the broken part, when it flies away from the pressure vessel 1, would be about 100 meters. However, the construction of the shield of this invention is designed so that it absorbs all of the energy of the broken part before the shield breaks. Preferably, the shield is designed so that its absorption of energy starts slowly by means of an elastic deformation, and the absorption of energy gradually increases by means of a plastic deformation.

For this example, a shield, as shown in FIGS. 1 and 2, can be suitably constructed to absorb the anticipated 19.50 × 10⁶ kg cm maximum kinetic energy of the broken part 16 of the pressure vessel 1 using strips 12 of mild steel of 8 cm width. Preferably, the mild steel has an ultimate tensile strength of about 42 kg/mm², a yield strength of about 24 kg/mm², and an elongation of about 20–27%. The strips are welded on to a pair of retaining rings 8 and 9. It is preferred that as many strips as possible be welded to the retaining rings around the vessel. Preferably, the diameter of the retaining rings is slightly greater, e.g., by about 4mm, than the outer diameter of the pressure vessel at the vertical shoulders 4 and 5 so that no stresses are applied to the shield during normal use of the vessel and shield.

Figure 6:
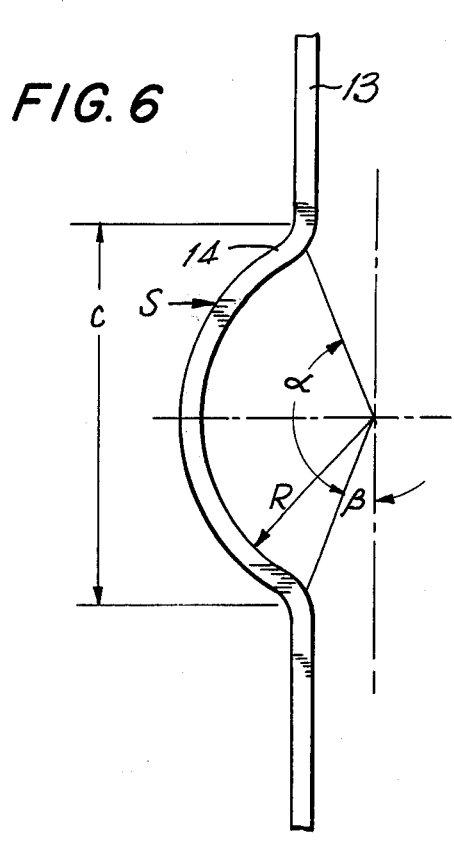
FIG. 6 is an expanded view of a portion of the protective shield of FIG. 1, showing the ductile means of this invention for absorbing the kinetic energy released if the pressure vessel fails.

In this example, each strip can include a plurality of arcuate segments 14, best shown in FIGS. 5 and 6. Preferably, the arcuate segments encompass an angle $\alpha$ in FIG. 6 of about 130° to 160°, especially an angle $\alpha$ of about 140°. It is also preferred that the arcuate segments be symmetrical, each angle $\beta$ in FIG. 6 being equal and preferably being about 10° to 25°. The radius R and angles $\alpha$ and $\beta$ of the arcuate segments in FIG. 6 are preferably adapted so that all of the kinetic energy of the broken part of the pressure vessel is absorbed by the elastic and plastic deformation of the arcuate segments to a straight condition.

In this example, when using the 8 cm straps of mild steel having arcuate segments of R = 6.0 cm, $\alpha$ 140° and $\beta$ = 20°, the length S of each arcuate segment is 2 × 6.0 cm × 140/360 = 14.66 cm, and the cord length C is 1.8794 × 6.0 cm = 11.28 cm. Hence, the substantial deformation of each arcuate segment in absorbing all or substantially all of the kinetic energy released is at least 14.66 cm – 11.28 cm = 3.38 cm. After each arcuate segment 14 undergoes this substantial deformation of 3.38 cm, it is substantially straight and substantially coplanar with the straight segments 13.

In this example, 64 of such straps 12, each strap having eighteen arcuate segments 14, act together with the rings 8 and 9 in accordance with this invention to provide an acceptable safety factor in a protective shield. This is so because, should the pressure vessel 1 fail, the kinetic energy of the broken part of the vessel 1 per arcuate segment would be substantially less than the actual energy required to break the straps 12 at an arcuate segment 14. The kinetic energy of the broken part per arcuate segment would be 19.50 × 10⁶ kg cm/64 × 18 = 1.6927 × 10⁴ kg cm, which is less than the energy required to break the arcuate segment. In tests, it has been found that each arcuate segment 14 of such a strap 12 can absorb 11.96 × 10⁴ kg cm before rupturing. Hence, for this example, the arcuate segments 14 could absorb up to seven times more energy without breaking than would be applied to each of the arcuate segments 14 by the failure of pressure vessel 1. In fact, in this example, the energy of the broken part of pressure vessel 1 would be absorbed by an elongation of the 64 straps of about 3.76 cm per arcuate segment 14 or an elongation only slightly greater than the elongation of 3.38 cm involved in completely stretching each arcuate segment 14 to a substantially straight condition.

A thin, cylindrical shield (not shown) may be added between the exterior cylindrical wall of the vessel 1 and the straps 12. The cylindrical shield affords an additional element of protection in the protective shield of this invention. Such a cylindrical shield can act as a protection against water or gas jets or broken parts flying-away from the pressure vessel in a radial direction.

A modified form of cage construction in accordance with this invention is illustrated in FIGS. 3 and 4. As shown in FIG. 3, the pressure vessel 1 having threaded end closures 2 and 3 is protected by a cage structure comprising rings 8 and 9 and rods 20. The rings 8 and 9 sit in annular recesses provided in the pressure vessel in the same manner as the rings 8 and 9 of FIGS. 1 and 2.

The rods 20 pass through aligned, spaced holes in the rings 8 and 9 and are held in position at the top by nuts 21 threaded on to the top ends of the rods 20. Similar nuts 22 threaded to the bottom ends of rods 20 are spaced from the lower horizontal surface of ring 9 by metal sleeves 23.

Upon a failure of the pressure vessel, e.g., a circumferential crack 15, energy absorption is accomplished by crumpling deformation of the sleeves 23, as shown in FIG. 4. When the sleeves 23 are completely crumpled, the full tensile strengths of the rods 20 are available for final absorption of energy.

The metal sleeves 23, when utilized as the ductile means of this invention for absorbing energy, can be formed from the same ductile materials utilized in the arcuate segments 14 of the straps 12 above. Likewise, the rods 20 and rings 8 and 9 in combination with the sleeves 23, can also be formed from the same ductile material as utilized in the arcuate segments 14. The number and design of such sleeves 23 preferably assure that a substantial portion of the energy released, if the pressure vessel 1 fails, is absorbed by the substantial deformation of the sleeves 23.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A protective shield for a pressure vessel, comprising:
   a ductile means for absorbing kinetic energy released if the pressure vessel fails by a portion of the pressure vessel breaking-off and tending to fly-away from the pressure vessel; said ductile means undergoing substantial deformation, but not breaking, when loaded by the portion of the pressure vessel tending to fly-away when the pressure vessel fails; and
   means for attaching said ductile means to said pressure vessel so that if said pressure vessel fails, said ductile means will be loaded by said portion of the pressure vessel breaking-off and tending to fly-away;
   said ductile means comprising a ductile arcuate segment of a strap; and said means for attaching said ductile means to said pressure vessel comprising a pair of rings, attached about opposite ends of the pressure vessel, and a pair of straight segments of said strap, each straight strap segment being connected to one of said rings and to an end of said ductile arcuate segment of said strap.

2. The protective shield of claim 1 wherein said substantial deformation of said ductile means comprises a change in length of about 20 to 80%.

3. The protective shield of claim 2 wherein said substantial deformation of said ductile means comprises a change in length of about 30 to 50%.

4. The protective shield of claim 1 wherein said ductile means has an ultimate tensile strength of about 37 to 45 kg/mm$^2$, a yield strength of about 20 to 24 kg/mm$^2$ and an elongation of 20 to 27%.

5. The protective shield of claim 4 wherein said ductile means is selected from the group of ductile materials consisting of mild steel, copper and aluminum.

6. The protective shield of claim 5 wherein said ductile means is mild steel.

7. The protective shield of claim 1 wherein said ductile means comprises a plurality of ductile, arcuate segments of a ductile strap; and said means for attaching said ductile means to said pressure vessel comprises ductile, straight segments at each end of said strap, connected to one of said rings; said strap having a plurality of straight metal strap segments alternating with said plurality of ductile, arcuate segments.

8. The protective shield of claim 1 wherein said pair of straight segments of said strap are connected to the outer surfaces of said rings and are spaced from the outer surface of the pressure vessel.

9. A protective shield for a pressure vessel, comprising:
   a plurality of elongated straps, extending along the axial length of the pressure vessel in circumferentially spaced apart relationship and made of a ductile material having an ultimate tensile strength of about 37 to 45 kg/mm$^2$, a yield strength of about 20 to 24 kg/mm$^2$ and an elongation of about 20 to 27%;
   each of said elongated straps including a plurality of alternating, straight segments and arcuate segments along its length; said arcuate segments being adapted to undergo substantial deformation, but not to break, when loaded by a portion of the pressure vessel breaking-off and tending to fly-away in an axial direction from the pressure vessel; and
   a pair of rings attached to the axial ends of the pressure vessel; the ends of said elongated straps being straight segments, attached to said rings;
   whereby, if the pressure vessel fails by a portion thereof tending to fly-away in an axial direction, said elongated straps and said arcuate segments thereof will be loaded by the portion of the pressure vessel tending to fly-away.

10. The protective shield of claim 9 wherein said substantial deformation of said arcuate segments comprises a change in length of about 20 to 80%.

11. The protective shield of claim 10 wherein said substantial deformation comprises a change in length of about 30 to 50%.

12. The protective shield of claim 10 wherein each arcuate segment encompasses an angle of about 130° to 160°.

13. The protective shield of claim 12 wherein each arcuate segment encompasses an angle of about 140°.

14. The protective shield of claim 12 wherein each arcuate segment is symmetrical.

15. The protective shield of claim 9 wherein said elongated straps are attached to the outer surfaces of said rings and are spaced from the outer surface of the pressure vessel.

* * * * *